US00RE37090E

(19) United States
(12) Reissued Patent
Kloosterman et al.

(10) Patent Number: US RE37,090 E
(45) Date of Reissued Patent: Mar. 13, 2001

(54) CHECK VALVE

(75) Inventors: Kenneth D. Kloosterman, Elkhart; John Barlow, Mishawaka, both of IN (US)

(73) Assignee: Dura Automotive Systems, Inc., Rochester Hills, MI (US)

(21) Appl. No.: 08/614,847

(22) Filed: Mar. 8, 1996

Related U.S. Patent Documents

Reissue of:
(64) Patent No.: 5,291,916
Issued: Mar. 8, 1994
Appl. No.: 08/997,546
Filed: Dec. 28, 1992

(51) Int. Cl.[7] ..... F16K 11/10; F16K 15/16

(52) U.S. Cl. ..... 137/112; 137/895; 137/907; 417/159

(58) Field of Search ..... 137/112, 114, 137/606, 895, 907; 417/152, 159

(56) References Cited

U.S. PATENT DOCUMENTS

| | | | | |
|---|---|---|---|---|
| 1,845,969 | * | 2/1932 | Hueber | 417/159 |
| 3,042,077 | * | 7/1962 | Waddington et al. | 137/112 X |
| 4,211,200 | * | 7/1980 | Rocchio et al. | 417/159 X |
| 4,913,192 | * | 4/1990 | Vaura | 137/895 X |
| 5,108,266 | * | 4/1992 | Hewitt | 417/159 |

* cited by examiner

*Primary Examiner*—Stephen M. Hepperle
(74) *Attorney, Agent, or Firm*—Banner & Witcoff, Ltd.

(57) ABSTRACT

A check valve which is positioned in the vacuum air line of an internal combustion engine. The check valve includes a single-piece valve body having an outlet port and two or more inlet ports, with one outlet port located substantially in line with the inlet port and connected by a venturi tube. The second inlet port is separated from the main air flow line by the valve stem and a diaphragm which allows communication there between and prevents back pressure. The second inlet port communicates with the outlet port through the valve stem and a second venturi tube which provides a vacuum boost to a device, usually vehicle brakes, connected to the inlet.

6 Claims, 2 Drawing Sheets

CHECK VALVE

Matter enclosed in heavy brackets [ ] appears in the original patent but forms no part of this reissue specification; matter printed in italics indicates the additions made by reissue.

FIELD OF THE INVENTION

This invention relates to valves, and will have special application to check valves used in internal combustion engines.

BACKGROUND OF THE INVENTION

Internal combustion engines have long employed air flow conduits to provide vacuum assist for automobile subsystems, such as brakes, automatic transmissions and others. These systems often employed chick valves located along the air flow conduit to prevent subsystem back pressure from reaching the engine. A typical check valve of this sort is described in U.S. Pat. No. 3,889,710.

Prior check valves employed either a continuous diameter airway or employed multiple valves and hoses to create a venturi effect and act as a vacuum booster for the subsystem to which it was associated. Space limitations in the automobile engine compartment all but preclude the use of multiple valve-hose system, while the prior art continuous diameter airways did not provide the increased power boost desired to implement the brakes or other subsystem.

SUMMARY OF THE INVENTION

This invention provides for a space-saving vacuum booster check valve located along a conduit between the air intake manifold and the brake booster. The check valve includes three or more ports connected by hoses to the air intake, block, and one or more vehicle subsystems. Venturi tubes in the valve body connect the various ports to provide a vacuum booster effect to the subsystem. A common concave valve seat and diaphragm serve to prevent back pressure from the subsystem from entering the main conduit between the air intake and the engine block.

Accordingly, it is an object of this invention to provide for a novel and improved check valve assembly.

Another object is to provide a check valve for an internal combustion engine which acts as a vacuum booster for vacuum assisted subsystems.

Another object is to provide a check valve for an internal combustion engine which is efficient, economical, durable, and still meets the minimal size specifications of an automobile engine compartment.

Other objects will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

Figure 1:
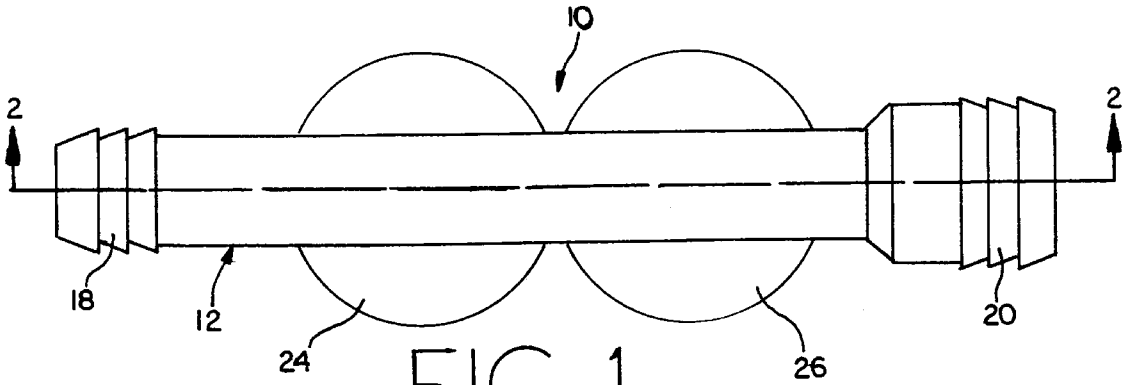
FIG. 1 is a plan view of the check valve of this invention.

The preferred embodiment of the invention herein described is not intended to be exhaustive or to limit the invention to the precise form disclosed. It is chosen and described to explain the principles of the invention, and its application and practical use to enable others skilled in the art to follow its-teachings.

Referring now to the drawings, reference numeral 10 refers generally to the check valve of this invention. Check valve 10 is normally employed in an internal combustion engine in the air flow line between the engine block and the air intake port at the full mixing port, normally a carburetor or fuel injection port. For clarity, the engine, carburetor, hose connections, and subsystems are not shown, and it is understood that these ports are common to the internal combustion engines found in almost all vehicles.

The air flow system in the typical internal combustion engine operates on the principle that as the engine operates, a partial vacuum is created which pulls air through the air intake port of the carburetor of fuel injector to aid in proper fuel combustion. This vacuum has been found to be useful in supplementing vacuum assist subsystems in the vehicle, particularly brakes, automatic transmissions and most recently, air conditioners. Check valve 10 provides the connection between the main airway and the subsystem and serves to inhibit back pressure from the subsystem from disturbing airflow through the main airway.

Check valve 10 shown in the drawings include a substantially one piece valve body 12 which is preferably formed of a top valve half 14 and a bottom valve half 16. The designations of top and bottom halves are for descriptive purposes only and are not limitative of the orientation of valve 10 in the engine compartment. Preferably, top valve half 14 is joined to bottom valve half 16 by sonic welding, heating or other conventional method prior to its use.

Bottom valve half 16 includes an air inlet 18 and an air outlet 20 which are in direct air flow communication via air passageway 22. In typical use in an internal combustion engine, air inlet 18 will be connected via a conduit (not shown) to the air intake port in the engine carburetor or other fuel injection member (not shown). Air outlet 20 is preferably connected via a conduit (not shown) to the vacuum port of the engine block (not shown).

As shown, bottom valve half 16 also includes lower valve seats 24, 26. Each lower valve seat 24, 26 is defined by a continuous outer wall 28, 29, and a bottom wall 30, 31. A bore 32, 33 is defined in each lower valve seat 24, 26 to allow for air flow communication with air passageway 22. Each outer wall 28, 29 may include stepped portion 58, 59 as shown to provide for ease in mating with upper valve seats 25, 27, as described later in this specification. A plurality of radially spaced fingers 34, 35 extend integrally upwardly from each bottom wall 30, 31 and serve to support a flexible seal member 36, 37. Air passageway 22 has an opening 38 which allows for air communication between the passageway and valve seat 24.

Figure 2:
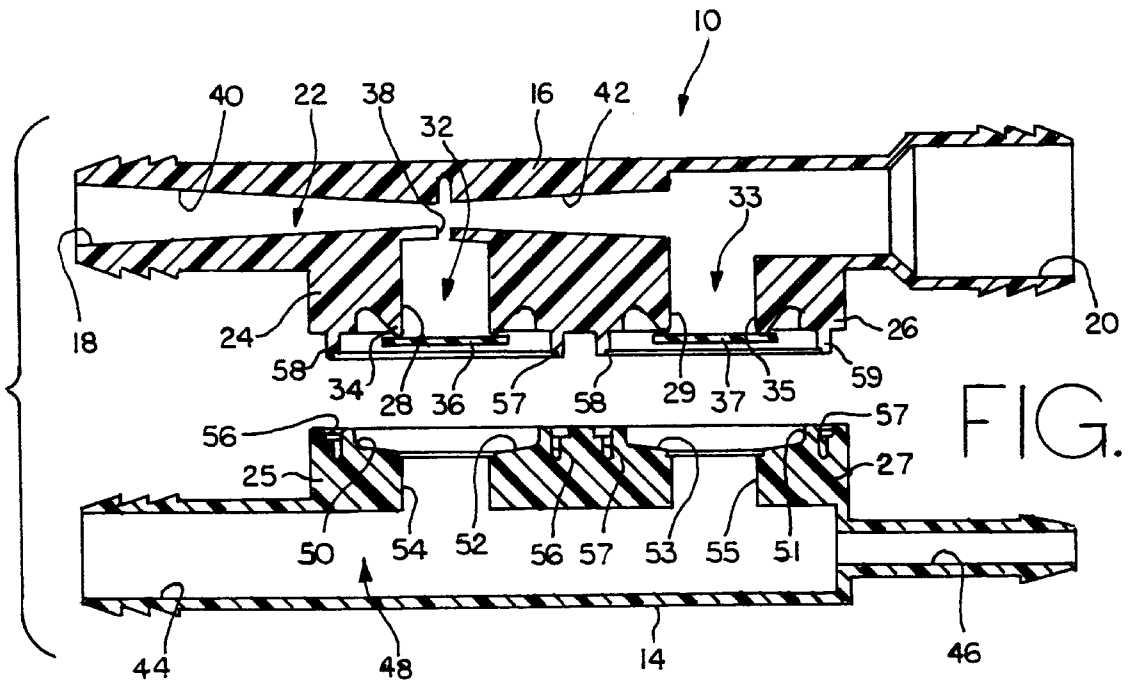
FIG. 2 is a cross-sectional view taken along line 2—2 of FIG. 1.

As shown in FIG. 2, air passageway 22 is defined by a tapering outer passage 40 which narrows from inlet port 18 up to the opening 38, and a widening passage 42 from opening 38 to the intersection of passageway 22 and valve seat 26. This configuration of passageway 22 is commonly known as a venturi conduit, whose functions are well known to those skilled in the art.

Upper valve half 14 is adopted to mate with lower valve half 14 to form check valve 10. Upper valve half 14 as shown includes inlet 44 and inlet 46 which may be connected in air flow communication by air passageway 48. In a typical connection to an internal combustion engine, inlet 44 will be connected via an air hose (not shown) to a brake system (not shown) and inlet 46 will be either capped or connected to another subsystem of a vehicle, such as the air conditioner compressor (not shown).

As shown, upper valve half 14 includes valve seats 25, 27. Each upper valve seat 25, 27 is defined by continuous outer wall 50, 51 and bottom wall 52, 53. A bore 54, 55 is defined in each upper valve seat 25, 27 to allow for air communication with air passageway 48 and inlets 44, 46. Bottom walls 52, 53 are preferably of a smooth concave configuration as shown with bores 54, 55 of a slightly lesser diameter than that of seals 36, 37. Each outer wall 50, 51 preferably has a circumferential groove 56, 57 substantially complemental to the stepped portion 58, 59 of the lower valve seats 24, 26.

Check valve 10 is assembled by aligning valve seats 24, 26 with valve seats 25, 27 such that stepped portions 58, 59 are aligned with grooves 56, 57. Seals 36, 37 are placed on fingers 34, 35, and the valve parts 14, 16 are then pressed together and joined as by sonic welding or other common method. The preferred method of joining valve parts 14, 16 will generally depend on the material used to form the valve parts, in this embodiment an injection molded heat resistant, rigid plastic. It is understood that an suitable plastic or metal or other compound may be used in forming check valve 10, which is now ready for implementation in the internal combustion engine as follows.

Figure 3:
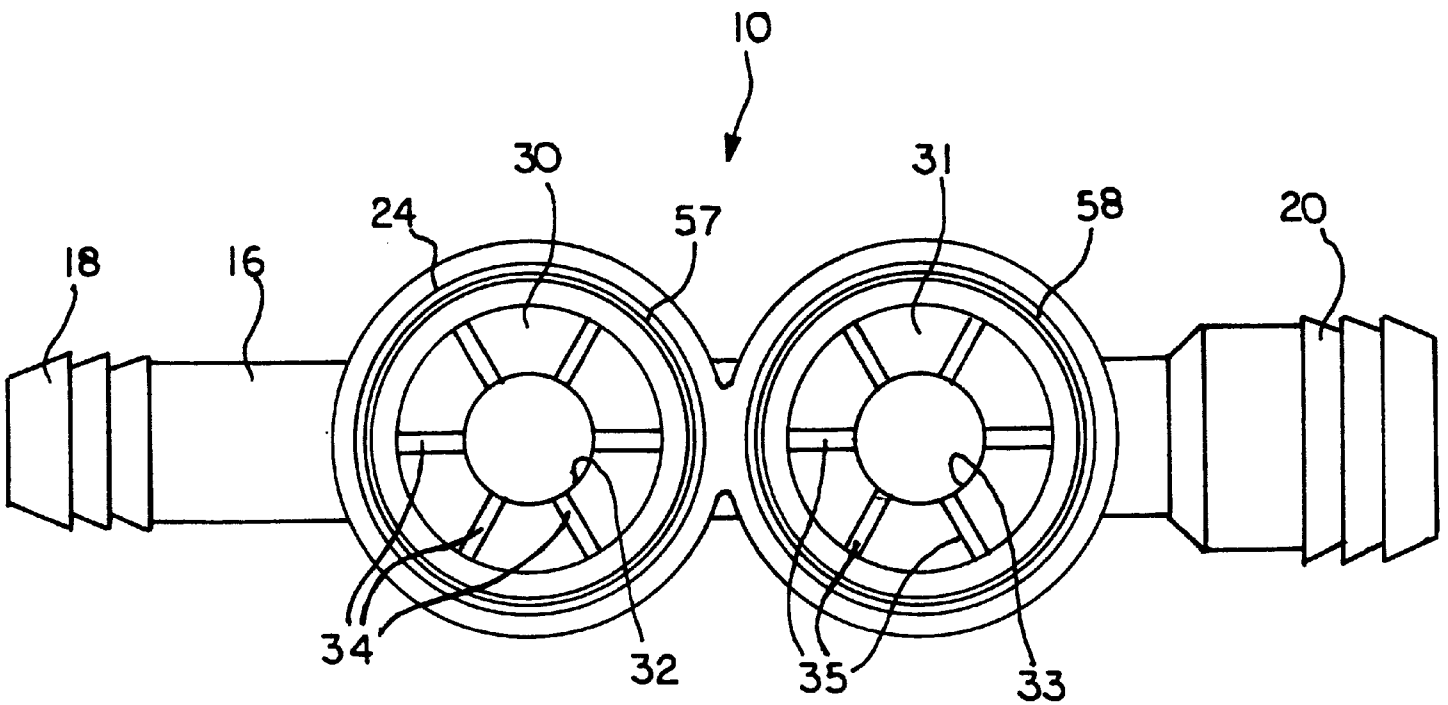
FIG. 3 is a plan view of the lower valve port.

With the above hose hook-ups mentioned above, check valve 10 functions as follows. As the engine (not shown) operates, it draws air through inlet 18, passageway 22 and outlet 20. This creates a partial vacuum in valve seats 24–27 and passageway 48 to draw seals 36, 37 downward against fingers 34, 35. Due to the spacing of fingers 34, 35 (FIG. 3) free air flow from passageway 48 to passageway 22 is allowed. The partial vacuum created by the operation of the engine serves in the vacuum assistance of the operation of the brake, and, if desired, air conditioning subsystems (not shown) in a common manner.

If for any reason, back pressure in one of the subsystems is generated to create a positive air flow through passageway 48 to inlets 44, 46 a reverse flow vacuum is generated to draw seals 36, 37 tight against valve seat bottom walls 52, 53 to prevent the vacuum from interfering with the above described air flow through passageway 22. The functioning of check valve 10 as thus far described is well-known to those skilled in the art.

As shown in FIG. 2 of the present invention, the tapering and widening passageways, 40, 42 create the novel venturi effect on the partial vacuum generated during the operation of the engine (not shown). By their configurations, passageways 40, 42 allow for a marked increase in the velocity with reduced pressure of the air passing through passageway 42. Due to the connection of passageway 22 and valve seats 24, 25, a marked increase in the amount of air drawn through passageway 48 and valve seats 25, 24 provides a significant boost in the vacuum assist for the subsystems (not shown) As an example, check valve 10 was tested in a conventional internal combustion engine which normally pulls a vacuum of about seven inches of mercury (7" Hg). The observed vacuum at outlet 44 with valve 10 in place was eighteen inches of mercury (18" Hg) which amounts to a 157% increase generated due to the use of valve 10 with its venturi effect passageways 40, 42.

It is understood that the above description does not limit the invention to the precise details disclosed, but may be modified within the scope of the following claims.

What is claimed is:

1. In a check valve including a valve body having a first air inlet port, an air outlet port in air flow communication with said first air inlet port to define an air passageway, a second air inlet port in air flow communication with said first air inlet port and said air outlet port wherein air is drawn from said second air inlet port towards said air outlet port, valve means positioned between said air passageway and said second air inlet port for inhibiting air flow from said air passageway through said second air inlet port, the improvement wherein said air passageway includes a venturi conduit positioned between said first air inlet port and said outlet port, said venturi conduit constituting means for enhancing air flow through said outlet port with a corresponding enhancement of air drawn from said second air inlet port towards said outlet port, said valve means including a valve seat positioned between said first and second inlet ports having an opening communicating with said air passageway, flexible seal means positioned in said valve seat for responding to air exiting said second air inlet port under outside vacuum influence and for seating against said valve seat to prevent air flow from said air passageway from exiting through said second air inlet port, said venturi conduit positioned immediately adjacent said valve seat opening to provide maximum vacuum boost through the valve seat.

2. The check valve of claim 1 and further including a third air inlet port in air flow communication with said second air inlet port to define a second air passageway in said valve body, said valve means positioned between said first-mentioned air passageway and said second air passageway.

3. The check valve of claim 2 wherein said valve means includes first and second spaced valve seats, each valve seat including a flexible seal means positioned in the valve seat for responding to air exiting one of said second and third air inlet ports under outside vacuum influence and for seating against its associated valve seat to prevent air flow from said first-mentioned passageway from exiting through its respective second and third air inlet ports.

4. The check valve of claim 3 wherein said venturi conduit has a tapered central portion of narrowed diameter immediately adjacent said valve seat opening.

*5. A check valve including a valve body having therewithin a first air inlet port, an air outlet port in air flow communication with said first air inlet port to define a first air passageway, said first air passageway including a first venturi conduit positioned between said first air inlet port and said air outlet port, a second air inlet port in air flow communication with said air outlet port to define a second air passageway, and valve means, including a valve seat positioned within said valve body between said first and second inlet ports and having an opening communicating with said first passageway, flexible seal means positioned in said valve seat for responding to air exiting said second air inlet port under outside vacuum influence and for seating against said valve seat to prevent air flow from said air passageway from exiting through said second air inlet port, said valve means being positioned between said first air passageway and said second air inlet port for inhibiting air flow from said first air passageway through said second air inlet port, said first venturi conduit being positioned immediately adjacent said valve means, wherein substantially all of the air drawn from said first air inlet port flows through said first air passageway towards said air outlet port and substantially all of the air drawn from said second air inlet port flows through both of said first and second air passageways towards said air outlet port.*

*6. The check valve of claim 5 wherein said second air passageway includes a second venturi conduit positioned between said second air inlet port and said air outlet port.*

* * * * *